US006968155B1

United States Patent
Palicot et al.

(10) Patent No.: US 6,968,155 B1
(45) Date of Patent: Nov. 22, 2005

(54) PROCESSING METHOD FOR A BROADBAND DIGITAL RADIO RECEIVER SIGNAL AND CORRESPONDING RADIO RECEPTION ARCHITECTURE

(75) Inventors: Jacques Palicot, Rennes (FR); Christian Roland, Saint-Didier (FR)

(73) Assignees: France Telecom SA, Paris (FR); Telediffusion de France SA, Paris (FR)

( * ) Notice: Subject to any disclaimer, the term of this patent is extended or adjusted under 35 U.S.C. 154(b) by 0 days.

(21) Appl. No.: 09/890,312

(22) PCT Filed: Jan. 25, 2000

(86) PCT No.: PCT/FR00/00152

§ 371 (c)(1),
(2), (4) Date: Oct. 9, 2001

(87) PCT Pub. No.: WO00/45521

PCT Pub. Date: Aug. 3, 2000

(30) Foreign Application Priority Data

Jan. 27, 1999 (FR) .................................... 99 01068

(51) Int. Cl.$^7$ .......................... H04B 1/00; H04B 15/00; H04B 1/06; H04B 7/00
(52) U.S. Cl. ..................................... 455/63.3; 455/266
(58) Field of Search .............................. 455/63.1, 63.3, 455/67.11, 71, 75, 130, 161.1, 168, 176.1, 455/205, 266; 375/316, 344, 346

(56) References Cited

U.S. PATENT DOCUMENTS

| 4,352,208 A | * | 9/1982 | Schroeder .................... 455/266 |
| 5,655,003 A | | 8/1997 | Erving et al. ................ 379/418 |
| 5,668,837 A | * | 9/1997 | Dent ........................... 375/316 |
| 5,745,856 A | * | 4/1998 | Dent ........................ 455/552.1 |

FOREIGN PATENT DOCUMENTS

| EP | 0 855 804 | 7/1998 |
| WO | WO 95/10889 | 4/1995 |
| WO | WO 96/21305 | 7/1996 |
| WO | WO 96/28946 | 9/1996 |

* cited by examiner

*Primary Examiner*—Benny Tieu
(74) *Attorney, Agent, or Firm*—Patterson, Thuente, Skaar & Christensen, P.A.

(57) ABSTRACT

A method for processing radio signals of a plurality of radio communication standards occupying a broadband frequency having a step which consists in broadband analysis to acquire information on the signals contained in the frequency broadband and selecting an appropriate narrowband processing to demodulate the radio signals; and a step which consists in processing in narrowband the radio signals contained in the frequency broadband to demodulate them.

24 Claims, 3 Drawing Sheets

PROCESSING METHOD FOR A BROADBAND DIGITAL RADIO RECEIVER SIGNAL AND CORRESPONDING RADIO RECEPTION ARCHITECTURE

BACKGROUND OF THE INVENTION

The present invention concerns a signal processing method for a wide band digital radio receiver and a reception architecture for implementing said method. It can be applied in particular in the field of mobile telephone terminals or television receivers.

The multiplication of standards, especially in telecommunications and more particularly in cellular telephone applications, has forced manufacturers to design specific products for each type of network. The current trend is thus to find a single product, the adaptation of this product to the network being effected by software.

Thus, the embodiment of a universal digital radio able to support all the demodulation diagrams and the most diverse protocol evolutions via a simple updating of the processing software of a numerical processor (DSP) constitutes the main objective of the software radio. Having regard to the technical improvements in the field of numerical processors and analog/digital converters, the software radio aims at digitalising the signals as close as possible to the antenna and designing a generic material portion.

One of the brakes for applying this techniques is the analog/digital converter. In fact, the best solution would consist of directly digitalising the signals at the output of the antenna. Unfortunately, the current technology of A/D converters does not make it possible to work at high sampling frequencies with sufficient dynamics and sensitivity to directly digitalise the signals at the output of the antenna. There are A/D converters able to sample at 1 Gigasample per second, but their resolution is limited to 8 bits in the best of cases which is clearly inadequate to recover GSM signals (200 KHz channel width and 90 dB dynamics) in a wide band of frequencies of about several hundreds of megahertz.

At the current moment, the only solution to simulate a software radio and thus process all the radio signals in a wide band of frequencies consists of stacking the narrow band digital receivers. However, this solution is not very satisfactory as it proves to be extremely expensive and does not support evolutions of standards.

OBJECTS AND SUMMARY OF THE INVENTION

Also one aim of the invention is to mitigate the drawbacks of said prior art by proposing a signal processing method and a reception architecture for a software radio able to process all the radio signals irrespective of their channel width and power in a wide range of frequencies.

Another aim of the invention is to propose a signal processing method for a wide band radio receiver for dealing with multiplication and the constant evolution of communication standards.

The object of the invention is to provide a method for processing radio signals from a plurality of radiocommunication standards occupying a wide band of frequencies and is characterised in that it comprises the following steps:
  a wide band analysis step for acquiring information concerning the radio signals contained in said wide band of frequencies and selecting a suitable narrow band processing for demodulating said radio signals, and
  a step for the narrow band processing of said radio signals contained in said wide band of frequencies so as to demodulate them.

In a first embodiment, the wide band analysis step consists of finding from the channels of the radiocommunication standards the channels containing radio signals. As soon as a channel containing a radio signal is found in the band of frequencies portion corresponding to a standard, a narrow band processing adapted to this standard is selected so as to demodulate said radio signal.

In a second embodiment, the wide band analysis consists of acquiring information for identifying the radiocommunication standard associated with each of the radio signals contained in said wide band of frequencies. For example, this information is the bearer frequency and/or the band width of these radio signals. After determining the communication standard of the radio signals of the band, it is possible to select an appropriate narrow band processing for demodulating these radio signals. The determination of the communication standard of the radio signals in effect makes it possible to discriminate the radio signals of the band of frequencies able to be demodulated directly by a digital processor and the radio signals requiring a narrow band processing by analog filtering.

In the case of radio signals able to be directly demodulated (generally relating to low dynamics radiocommunication standards), the narrow band processing (extraction of the signal and demodulation) of the radio signals is directly carried out by a digital processor, preferably the one which has carried out the wide band analysis, and the signal processing method proposed then functions like a genuine software radio.

For the other signals, according to the invention, a software radio is functionally simulated by isolating the radio signals to be demodulated by analog filtering and by then demodulating these signals, after an analog/digital conversion, by a digital processor.

The invention also concerns a software radio receiving architecture able to process the radio signals of a plurality of radiocommunication standards occupying one or several wide bands of frequencies, characterised in that it comprises:
  wide band analysis means for acquiring information on the radio signals contained in said wide band of frequencies and selecting a narrow band processing of said radio signals according to the information acquired by said wide band analysis means, and
  narrow band processing means for demodulating said radio signals contained in said wide band of frequencies.

BRIEF DESCRIPTION OF THE DRAWINGS

Other characteristics and advantages of the invention shall appear more readily from a reading of the following detailed description with reference to the accompanying drawings amongst which.

DESCRIPTION OF THE PREFERRED EMBODIMENT

In the continuation of the description, it shall be admitted that the band of frequencies to be analysed can contain several radio signals, each radio signal being transmitted in one radio channel. Furthermore, a distribution or communication standard includes a set of channels satisfying a particular specification.

So as to demodulate all the radio signals, regardless of their width and power, present in one or several wide bands of frequencies, the invention aims to first of all analyse the band of frequencies so as to determine an adequate narrow band processing so as to demodulate the radio signals contained in this band of frequencies and then apply this narrow band processing.

This analysis may consist of looking in the band of frequencies of each communication standard for channels containing useful radio signals for the applications of a receiver.

Figure 1:
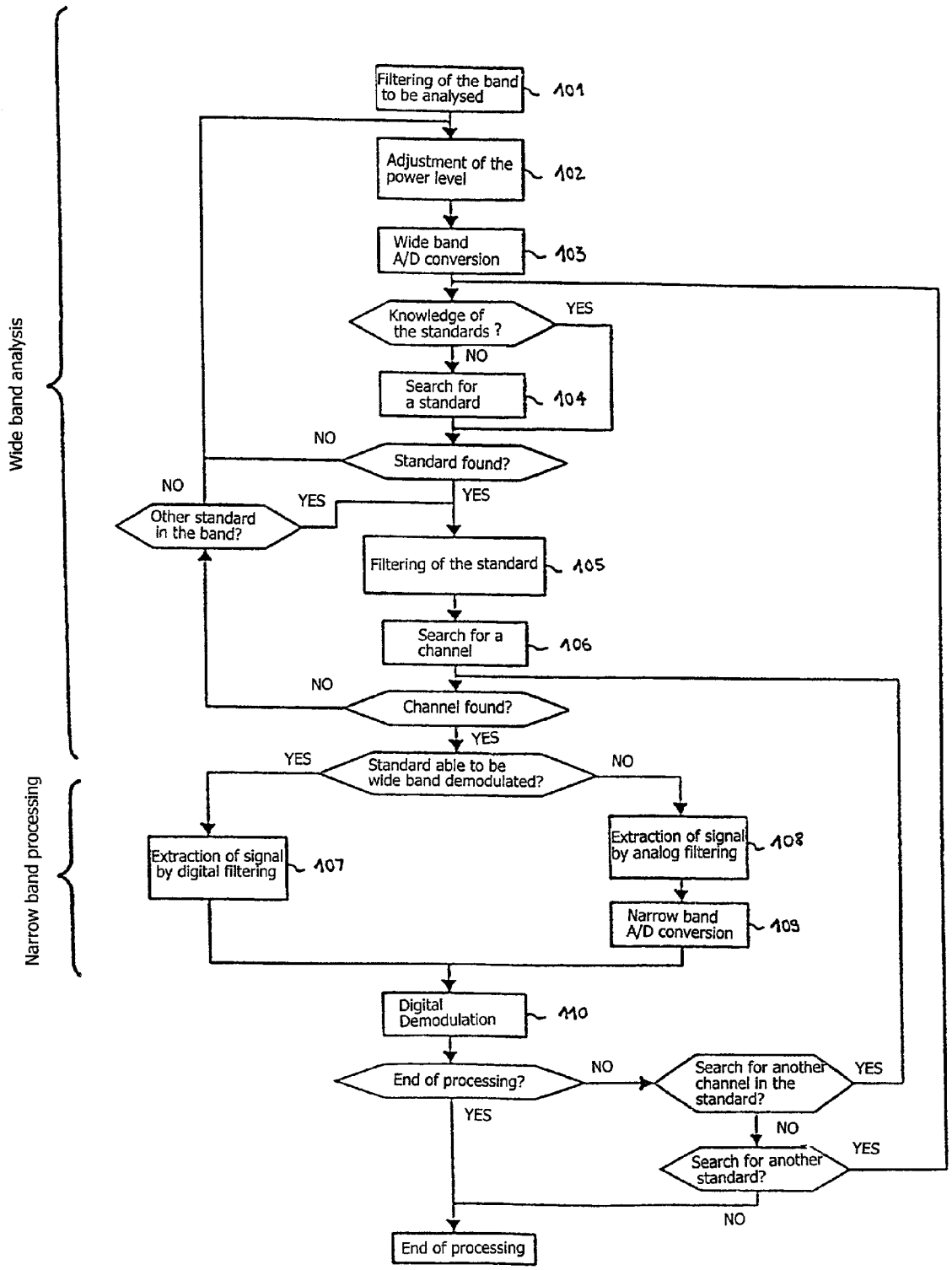
FIG. 1 is a detailed flowchart of the steps carried out by the signal processing method of the invention.

A flowchart of the steps of a first embodiments of the method of the invention is shown on FIG. 1.

According to this embodiment, the wide band analysis step first of all comprises a step 101 for filtering the band to be analysed, and a step 102 for adjusting the power level of the received radio signals. The analog signals of the band of frequencies accordingly adjusted are then converted into digital signals in a step 103. Given the fact of the size of the band of frequencies to be analysed (several tens of megahertz), an analog/digital converter is provided able to work at a relatively high sampling frequency of about 250 megasamples per second for a resolution of 8 bits. The digitised signals are then processed by a digital processor. The aim allotted to this processor is to find the radio signals contained in the band of filtered frequencies. This finding is carried out per communication standard.

If the digital processor knows the possible communication standards in the selected band of frequencies, it selects in step 105 a first standard, otherwise it looks in a step 104 for a first communication standard in the band of frequencies, for example with the aid of a Fourier transform (FFT) by comparing the various parameters (carrier frequency, band width, type of access, . . . ) of the spectrum obtained at various templates of known parameters, and selects it in the next step 105. This standard selection step is made by filtering of the corresponding portion of the band of frequencies. Then in a step 106 the processor looks in this band portion for a channel transmitting a radio signal.

If this channel is found, the analysed band of frequencies undergoes a narrow band processing step in order to extract the radio signal of said channel and demodulate it. So as to extract this signal, it is necessary to know if the resolution of the A/D converter used in step 103 is sufficient to allow a digital demodulation of this signal after the signal has been extracted by digital filtering. This extraction by digital filtering following analysis of the band is possible when the communication standard of said radio signal extracted has a maximum peak power lower than a threshold value which depends on the resolution of the A/D converter. For example, this is the case for DECT or IS95 signals. The method of the invention then functions as a genuine software radio. The signal extraction step by means of digital filtering is given the reference 107 on FIG. 1.

In a case where the resolution of the A/D converter is insufficient to directly extract the radio signal by means of digital filtering, according to the invention, it is possible to reduce the size of the band of frequencies to be processed to the width of the channel carrying the radio signal via the analog filtering of said channel (step 108). The filtered signal is then converted (step 109) into a digital signal.

After analog or digital filtering, the digital signals obtained are then demodulated by a digital processor in a step 110.

Of course, if no signal is found in the first analysed standard, searches for signals are carried out in the other possible standards of the band of frequencies.

After demodulating a first signal, it is possible to in addition demodulate other signals in the same standard or signals in other standards.

It is to be noted that, when the size of the band of frequencies is more than about 100 MHz, the analysis of the band of frequencies is made per portions of 100 MHz for example so that the sensitivity of the converter is sufficient to allow an effective analysis of the band of frequencies in the digital processor.

In a second embodiment (not shown), the steps 104 to 106 are replaced by a more general search step for looking in the selected band of frequencies for information concerning the communication standard of the radio signals contained in this band. A search is made for example of the carrier frequency and/or band width of said radio signals of the band of frequencies. Then the information collected is compared with the known parameters of the communication standards so as to identify the communication standard of the radio signals of the analysed band of frequencies. Once the communication standard(s) of the radio signals of the band of frequencies has/have been identified, it is then possible to determine the narrow band processing to be applied to the signals so as to demodulate them.

It is also possible to look for other parameters characterising the radio signals of the band of frequencies, such as their cycle frequency or type of modulation used. These parameters shall then be used with the processor for the actual demodulation of the radio signals.

Figure 2:
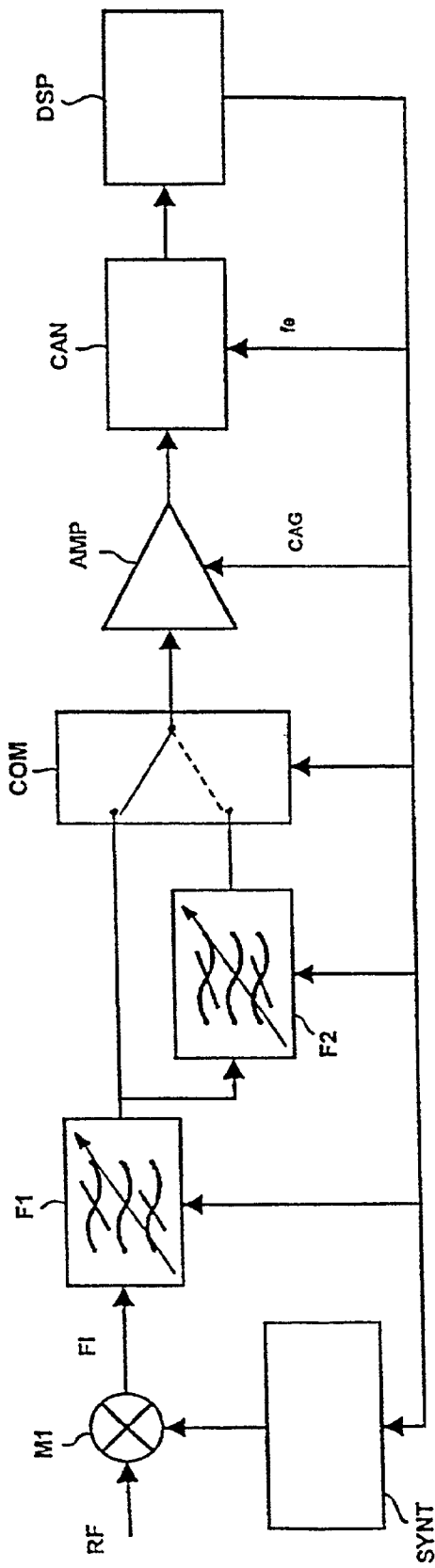
FIGS. 2, 3 and 4 are functional reception architecture diagrams for a software radio for implementing the signal processing method of the invention.
Figure 3:
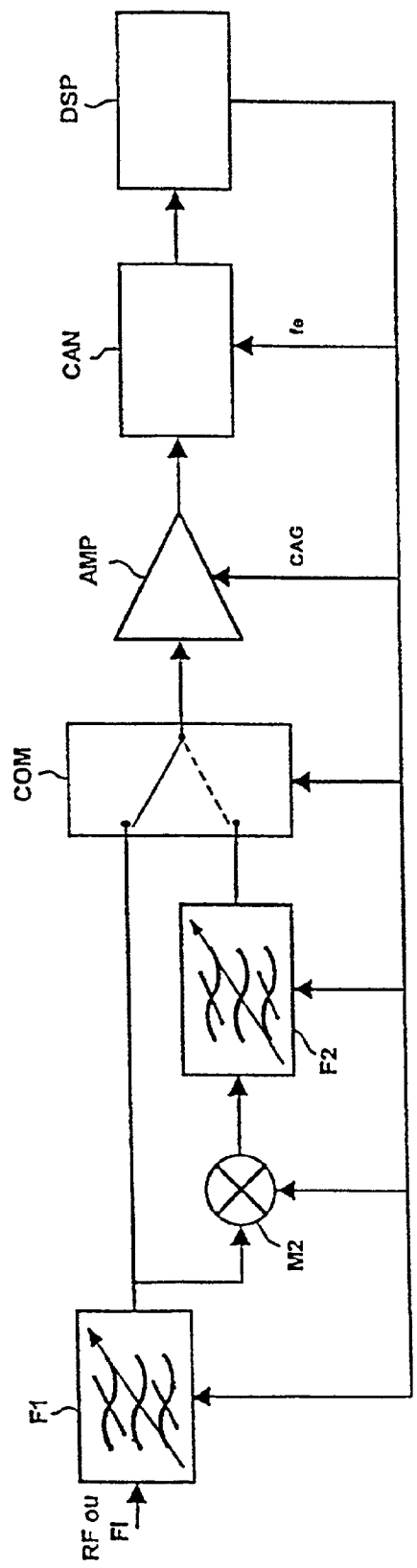
Figure 4:
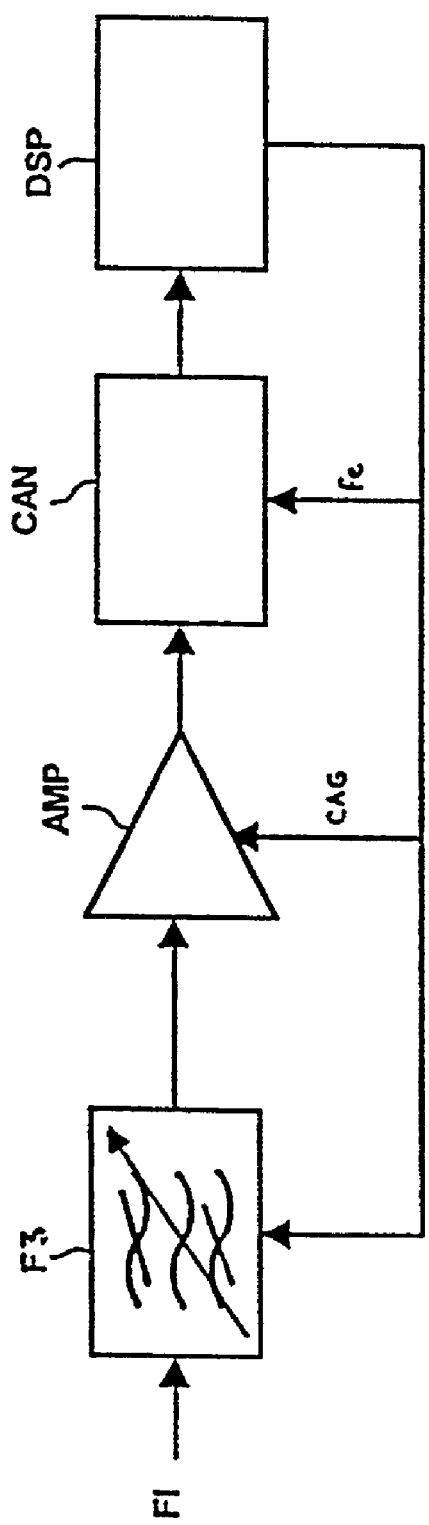

So as to implement these embodiments of the method of the invention, several possible architectures shown on FIGS. 2 to 4 are proposed.

The radio frequency signals received at the input of the device are given the reference RF. In a first embodiment shown on FIG. 2, the signals RF are transposed to an intermediate frequency FI using a mixer M1 and a synthesizer S. It is to be noted that the signals RF are previously filtered and amplified (not shown) so as to adapt their power level.

The transposed signals are then filtered by a pass-band type filtering block F1 so as to only allow the band of frequencies to be analysed to pass. The pass-band of this filtering block is advantageously size and position-adjustable to allow an analysis of the overall band portion by portion or standard by standard. In practice, the maximum size of the pass-band of the filter F1 is currently limited to about 100 MHz so as to take account of the characteristics of the A/D converters.

The power level of the radio signals of the filtered band is then adjusted by an automatic gain control amplifier AMP. The signals obtained are digitally converted by an analog/digital converter CAN and then processed by a digital processor DSP. This processor is set to carry out standard and channel searches in the digitalised band of frequencies or look for the parameters of the radio signals contained in said band of frequencies.

If the channel found by the processor during analysis contains low dynamics signals (for example DECT or IS95 signals), the extraction of the signal from the found channel is carried out in the processor DSP by means of digital filtering. The signals of this channel can then be demodulated by this same processor or another processor. To be precise, the digital filtering is implemented when the communication standard(s) of the radio signals contained in the band of frequencies has/have a maximum peak power lower than a threshold value which depends on the resolution of the analog/digital converter CAN.

In the opposite case, extraction of the signal from the channel is carried out by analog filtering using a filtering block F2 series-connected with the filtering block F1. The block F2 is either a programmable filter or a bank of filters.

The signals derived from the filtering block F2 are then transmitted to the input of the amplifier AMP by means of a switch COM. The signals of the selected channel are then amplified by the amplifier AMP and then converted by the converter CAN and demodulated by the processor DSP.

It is to be noted that the processor DSP adjusts the sampling frequency fe of the converter CAN and the automatic gain control of the amplifier AMP for the wide band analysis and, if necessary, modifies them for the narrow band processing. It also controls the synthesizer and the size and position adjustment of the pass-band of the filtering blocks F1 and F2.

In the embodiment shown on FIG. 2, the demodulation of the signals is carried out at the intermediate frequency FI. So as to carry out a baseband demodulation or at a lower intermediate frequency, it is possible to provide a second mixer M2 between the filtering blocks F1 and F2. This embodiment variant is shown on FIG. 3.

A more generic architecture is shown on FIG. 4. In this architecture, the filtering blocks F1 and F2 are combined into one and the same filtering block F3 whose pass-band is size and position-adjustable by the processor DSP.

What is claimed is:

1. A method for processing radio signals of a plurality of radiocommunication standards occupying a wide band of frequencies, comprising:
    acquiring information concerning the radio signals contained in said wide band of frequencies and selecting a suitable narrow band processing for demodulating said radio signals in a wide band analysis phase, and
    processing said radio signals contained in said wide band of frequencies to demodulate said radio signals in a narrow band processing phase,
    said wide band analysis phase comprising the step of looking for at least one channel containing radio signals able to be demodulated in said narrow band processing step, among channels of said radiocommunication standards.

2. The method according to claim 1, wherein the wide band analysis phase further comprises the step of acquiring information for identifying the radiocommunication standard associated with each of said radio signals contained in said wide band of frequencies.

3. The method according to claim 2, wherein the wide band analysis phase further comprises the step of looking for a carrier frequency and/or a band width of the radio signals contained in said wide band of frequencies.

4. The method according to claim 2, wherein the wide band analysis phase further further comprises the step of looking for a cycle frequency and/or a type of modulation of the radio signals contained in said wide band of frequencies.

5. The method according to claim 2, wherein the wide band analysis phase further comprises the steps of digital/analog conversion of the radio signals of said wide band of frequencies, and digitally processing resultant digital signals to obtain said information concerning the radiocommunication standard of said radio signals.

6. The method according to claim 1, wherein the narrow band processing phase further comprises the steps of extracting each radio signal contained in said wide band of frequencies, and demodulating each of said extracted radio signals.

7. The method according to claim 6, wherein the step of extracting each of said radio signal comprises an analog filtering of the wide band of frequencies when the radiocommunication standard of said radio signal has a maximum peak power greater than a threshold value.

8. The method according to claim 7, wherein said threshold value depends on the resolution of the digital signals at the end of the step of analog/digital conversion of said wide band analysis phase.

9. The method according to claim 6, wherein the radio signal extraction step comprises a digital filtering of the analyzed radio signals when the radiocommunication standard of said radio signal has a maximum peak power lower than a threshold value.

10. The method according to claim 1, wherein the wide band of frequencies is analyzed per portion of several tens of megahertz.

11. The method according to claim 1, wherein the wide band of frequencies is analyzed standard by standard.

12. A software radio receiving unit for processing radio signals of a plurality of radiocommunication standards occupying a wide band of frequencies, comprising:
    wide band analysis means for acquiring information concerning the radio signals contained in said wide band of frequencies and selecting a narrow band processing of said radio signals according to the information acquired by said wide band analysis means, and
    narrow band processing means for demodulating said radio signals contained in said wide band of frequencies,
    said wide band analysis means carrying out a search for at least one channel containing radio signals among channels of the radiocommunication standards.

13. The receiving unit according to claim 12, wherein the wide band analysis means carrying out a search for information able to identify the radiocommunication standard associated with each of said radio signals contained in said wide band of frequencies.

14. The receiving unit according to claim 13, wherein the wide band analysis means carries out a search for a carrier frequency and/or a band width of the radio signals contained in said wide band of frequencies.

15. The receiving unit according to claim 13, wherein the wide band analysis means carries out a search for a cycle frequency and/or a modulation type of the radio signals contained in said wide band of frequencies.

16. The receiving unit according to claim 12, wherein the narrow band processing means comprise means for extracting the radio signals contained in said wide band of frequencies and means for demodulating said extracted signals.

17. The receiving unit according to claim 12, wherein the wide band analysis means comprise a first filtering block having a pass-band corresponding to a band of frequencies to be analyzed, a first amplifier for adjusting a power level of the signals present in said band of frequencies to be analyzed, a first digital/analog converter for converting said power-adjusted signals, and a first digital processing processor for analyzing resultant digital signals and deducing the radiocommunication standard of said analyzed signals.

18. The receiving unit according to claim 17, wherein the pass-band of said first filtering block is position- and size-adjustable.

19. The receiving unit according to claim 17, wherein the narrow band processing means comprise a second digital processor for extracting the radio signals via digital filtering and a digital demodulation of said extracted signals.

20. The receiving unit according to claim 19, wherein the first and second digital processors are one digital processor.

21. The receiving unit according to claim 17, wherein the narrow band processing means comprise a second filtering block having a pass-band adjusted according to the size and position of the channel to be selected, a second amplifier for adjusting the power level of the radio signals to be demodulated, a second analog/digital converter and a second digital processing processor for demodulating said resultant digital signals.

22. The receiving unit according to claim 21, wherein the first and second filtering blocks, the first and second amplifiers, the first and second analog/digital converters, and the first and second digital processing processors are physically respectively one filtering block, one amplifier, one analog/digital converter, and one digital processing processor.

23. The receiving unit according to claim 12, further comprising upstream of the wide band analysis means and narrow band processing means a frequency transposition device for transposing the radio signals to an intermediate frequency.

24. The receiving unit according to claim 12, wherein the narrow band processing means further comprise a frequency transposition device for transposing into a base band or to an extremely low intermediate frequency the signals to be demodulated by said narrow band processing means.

* * * * *